D. M. CUMMINGS.
Revolving-Harrow.

No. 26,167.

Patented Nov. 22, 1859.

Witnesses:
Alpheus Conant
Amos Peree

Inventor:
D. M. Cummings

UNITED STATES PATENT OFFICE.

D. M. CUMMINGS, OF ENFIELD, NEW HAMPSHIRE.

IMPROVEMENT IN HARROW-TEETH.

Specification forming part of Letters Patent No. 26,167, dated November 22, 1859.

*To all whom it may concern:*

Be it known that I, D. M. CUMMINGS, of Enfield, in the county of Grafton and State of New Hampshire, have invented a new and Improved Tooth for Harrows; and I do hereby declare that the following is a full, clear, and exact description of the same, reference being had to the accompanying drawings, forming a part of this specification, in which—

Figure 1:
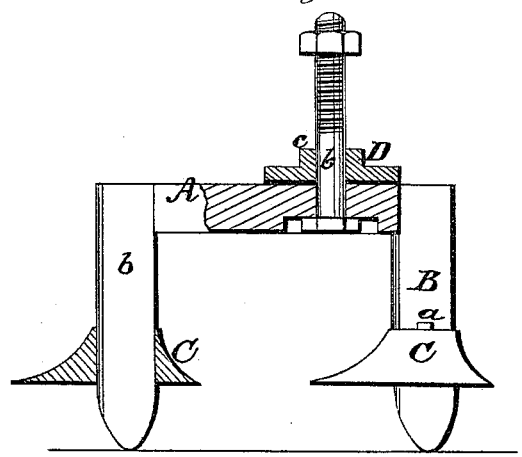
Figure 2:
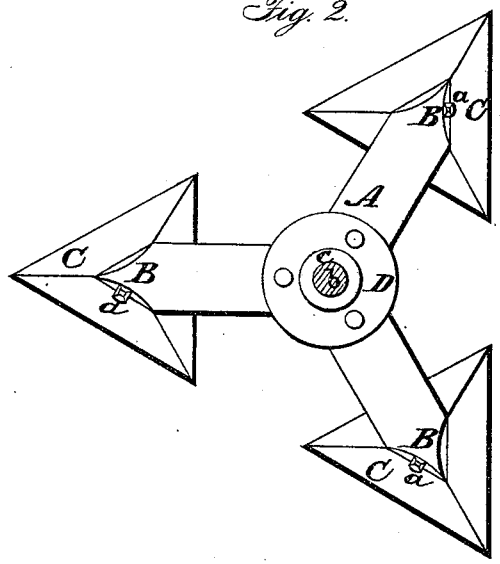

Figure 1 represents a vertical central section of my invention. Fig. 2 is a plan or top view of the same.

Similar letters of reference in both figures indicate corresponding parts.

This invention consists in arranging each tooth with three prongs, that are furnished with sharp-pointed shields, which serve to gage the depth to which the teeth cut; and it also consists in combining with each tooth a wedge-shaped plate in such a manner that the teeth can be adjusted according to the soil in which they have to work.

To enable those skilled in the art to make and use my invention, I will proceed to describe it.

The teeth A are constructed with three prongs, B. These prongs are made three-sided, and in order to make the corners very sharp the sides are hollowed out or fluted. Each prong is furnished with a shield, C, which is adjustable on the same, being secured by means of a wedge, *a*. These shields have sharp points, and they serve to gage the depth to which the teeth are to cut, and, furthermore, their sharp points assist in pulverizing the soil. Each tooth is secured to the frame of the harrow by means of a screw-bolt, *b*. The hole in the frame through which said bolt passes is protected on its under side by a plate, D, the central portion of which forms a hub, *c*, which serves to give said plate a better hold in the wood. The plate itself is made thinner on one side than on the other, so that a cross-section of the same assumes the shape of a wedge, as clearly shown in Fig. 1. By means of these plates the teeth are adjusted according to the soil in which they have to work. If the thinnest portion of the plate is in front, the first prong of the tooth is thrown up; but if the thickest portion of the plate is in front the first prong is depressed, so that by turning said plate the tooth is made to extend deeper or shallower. Each tooth is reversible on its bolt *b*, so that the several prongs can be made to wear out all alike, and if one of the teeth runs against an obstruction it frees itself as it is made to swing round.

What I claim as new, and desire to secure by Letters Patent, is—

1. Constructing the tooth A of a harrow with prongs B and sharp-pointed shields C, substantially as and for the purpose specified.

2. In combination with the above, the wedge-shaped plate D, substantially in the manner and for the purpose described.

D. M. CUMMIN

Witnesses:
 ALPHEUS CONANT,
 AMOS PIERCE.